(12) United States Patent
Zhu et al.

(10) Patent No.: US 12,743,744 B2
(45) Date of Patent: Sep. 22, 2026

(54) CROSS-VIEW IMAGE GEO-LOCALIZATION

(71) Applicant: University of Central Florida Research Foundation, Inc., Orlando, FL (US)

(72) Inventors: Sijie Zhu, Santa Clara, CA (US); Chen Chen, Orlando, FL (US); Mubarak Shah, Winter Park, FL (US)

(73) Assignee: University of Central Ponios Research: Foundation, Inc, Orlando, FL (US)

( * ) Notice: Subject to any disclaimer, the term of this patent is extended or adjusted under 35 U.S.C. 154(b) by 277 days.

(21) Appl. No.: 18/414,626

(22) Filed: Jan. 17, 2024

(65) Prior Publication Data

US 2024/0303770 A1 Sep. 12, 2024

Related U.S. Application Data

(60) Provisional application No. 63/488,548, filed on Mar. 6, 2023.

(51) Int. Cl.
*G06T 3/4053* (2024.01)
*G06V 10/764* (2022.01)

(52) U.S. Cl.
CPC .......... *G06T 3/4053* (2013.01); *G06V 10/764* (2022.01)

(58) Field of Classification Search
CPC ...... G06V 10/764; G06V 10/40; G06V 10/48; G06T 3/4053; G06T 3/4046; G06T 15/00
See application file for complete search history.

(56) References Cited

U.S. PATENT DOCUMENTS

2023/0290135 A1 * 9/2023 Zhou ...................... G06V 20/56

FOREIGN PATENT DOCUMENTS

WO WO-2023168613 A1 * 9/2023 ......... G06F 21/1014

OTHER PUBLICATIONS

Zhu, Y., Yang, H., Lu, Y., & Huang, Q. (2023). Simple, Effective and General: A New Backbone for Cross-view Image Geo-localization. ArXiv, abs/2302.01572. (Year: 2023).*

(Continued)

*Primary Examiner* — Vu Le
*Assistant Examiner* — Jessica Yifang Lin
(74) *Attorney, Agent, or Firm* — FLEIT Intellectual Property Law; Jon Gibbons

(57) ABSTRACT

CNN-based methods for cross-view image geo-localization rely on polar transform and fail to model global correlation. A pure transformer-based approach (TransGeo) is described to address these limitations from a different perspective. TransGeo takes full advantage of the strengths of the transformer related to global information modeling and explicit position information encoding. The claimed invention further leverages transformer input's flexibility and discloses an attention-guided non-uniform cropping method so that uninformative image patches are removed with a negligible drop in performance to reduce computation cost. The saved computation can be reallocated to increase resolution only for informative patches, resulting in performance improvement with no additional computation cost. This "attend and zoom-in" strategy is highly similar to human behavior when observing images. Remarkably, TransGeo achieves state-of-the-art results on both urban and rural datasets, with significantly less computation cost than CNN-based methods. It does not rely on polar transform and provides faster methods.

20 Claims, 14 Drawing Sheets

(56) References Cited

OTHER PUBLICATIONS

Zhu, S., Shah, M., & Chen, C. (2022). TransGeo: Transformer Is All You Need for Cross-view Image Geo-localization. 2022 IEEE/CVF Conference on Computer Vision and Pattern Recognition (CVPR), 1152-1161. (Year: 2022).*
Zhu, Yingying et al. "Simple, Effective and General: A New Backbone for Cross-view Image Geo-localization." ArXiv abs/2302.01572 (2023): n. pag. (Year: 2023).*
Zhu, Sijie et al. "TransGeo: Transformer Is All You Need for Cross-view Image Geo-localization." 2022 IEEE/CVF Conference on Computer Vision and Pattern Recognition (CVPR) (2022): 1152-1161. (Year: 2022).*
Eli Brosh, Matan Friedmann, Ilan Kadar, Lev Yitzhak Lavy, Elad Levi, Shmuel Rippa, Yair Lempert, Bruno Fernandez-Ruiz, Roei Herzig, and Trevor Darrell. Accurate visual localization for automotive applications. In Proceedings of the IEEE Conference on Computer Vision and Pattern Recognition Workshops, pp. 0-0, 2019.
Sudong Cai, Yulan Guo, Salman Khan, Jiwei Hu, and Gongjian Wen. Ground-to-aerial image geo-localization with a hard exemplar reweighting triplet loss. In Proceedings of the IEEE International Conference on Computer Vision, pp. 8391-8400, 2019.
Xiangning Chen, Cho-Jui Hsieh, and Boqing Gong. When vision transformers outperform resnets without pretraining or strong data augmentations. arXiv preprint arXiv:2106.01548, 2021.
Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.
Jacob Devlin, Ming-Wei Chang, Kenton Lee, and Kristina Toutanova. Bert: Pretraining of deep bidirectional transformers for language understanding. arXiv preprint arXiv:1810.04805, 2018.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16x16 words: Transformers for image recognition at scale. In International Conference on Learning Representations, 2020.
Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Sixing Hu, Mengdan Feng, Rang MH Nguyen, and Gim Hee Lee. Cvm-net: Cross-view matching network for image-based ground-to-aerial geo-localization. In Proceedings of the IEEE Conference on Computer Vision and Pattern Recognition, pp. 7258-7267, 2018.
Jungmin Kwon, Jeongseop Kim, Hyunseo Park, and In Kwon Choi. Asam: Adaptive sharpness-aware minimization for scale-invariant learning of deep neural networks. arXiv preprint arXiv:2102.11600, 2021.
Tsung-Yi Lin, Serge Belongie, and James Hays. Cross-view image geolocalization. In Proceedings of the IEEE Conference on Computer Vision and Pattern Recognition, pp. 891-898, 2013.
Liu and Hongdong Li. Lending orientation to neural networks for cross-view geo-localization. In Proceedings of the IEEE conference on computer vision and pattern recognition, pp. 5624-5633, 2019.
Ang Li, Huiyi Hu, Piotr Mirowski, and Mehrdad Farajtabar. Cross-view policy learning for street navigation. In Proceedings of the IEEE International Conference on Computer Vision, pp. 8100-8109, 2019.
Ilya Loshchilov and Frank Hutter. Sgdr: Stochastic gradient descent with warm restarts. arXiv preprint arXiv:1608.03983, 2016.
Ilya Loshchilov and Frank Hutter. Decoupled weight decay regularization. arXiv preprint arXiv:1711.05101, 2017.
Piotr Mirowski, Matt Grimes, Mateusz Malinowski, Karl Moritz Hermann, Keith Anderson, Denis Teplyashin, Karen Simonyan, Andrew Zisserman, Raia Hadsell, et al. Learning to navigate in cities without a map. In Advances in Neural Information Processing Systems, pp. 2419-2430, 2018.
Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. Advances in neural information processing systems, 32:8026-8037, 2019.
Krishna Regmi and Mubarak Shah. Bridging the domain gap for ground-to-aerial image matching. In Proceedings of the IEEE International Conference on Computer Vision, pp. 470-479, 2019.
Florian Schroff, Dmitry Kalenichenko, and James Philbin. Facenet: A unified embedding for face recognition and clustering. In Proceedings of the IEEE conference on computer vision and pattern recognition, pp. 815-823, 2015.
Yujiao Shi, Liu, Xin Yu, and Hongdong Li. Spatial-aware feature aggregation for image based cross-view geo-localization. In Advances in Neural Information Processing Systems, pp. 10090-10100, 2019.
Yujiao Shi, Xin Yu, Dylan Campbell, and Hongdong Li. Where am i looking at? joint location and orientation estimation by cross-view matching. In Proceedings of the IEEE/CVF Conference on Computer Vision and Pattern Recognition, pp. 4064-4072, 2020.
Bin Sun, Chen, Yingying Zhu, and Jianmin Jiang. Geocapsnet: Ground to aerial view image geo-localization using capsule network. In 2019 IEEE International Conference on Multimedia and Expo (ICME), pp. 742-747. IEEE, 2019.
Christian Szegedy, Vincent Vanhoucke, Sergey Ioffe, Jon Shlens, and Zbigniew Wojna. Rethinking the inception architecture for computer vision. In Proceedings of the IEEE conference on computer vision and pattern recognition, pp. 2818-2826, 2016.
Yicong Tian, Chen, and Mubarak Shah. Cross-view image matching for geo-localization in urban environments. In Proceedings of the IEEE Conference on Computer Vision and Pattern Recognition, pp. 3608-3616, 2017.
Aysim Toker, Qunjie Zhou, Maxim Maximov, and Laura Leal-Taixé. Coming down to earth: Satellite-to-street view synthesis for geo-localization. In Proceedings of the IEEE/CVF Conference on Computer Vision and Pattern Recognition, pp. 6488-6497, 2021.
Hugo Touvron, Matthieu Cord, Matthijs Douze, Francisco Massa, Alexandre Sablayrolles, and Hervé Jégou. Training data-efficient image transformers & distillation through attention. In International Conference on Machine Learning, pp. 10347-10357. PMLR, 2021.
Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in neural information processing systems, pp. 5998-6008, 2017.
Nam N Vo and James Hays. Localizing and orienting street views using overhead imagery. In European conference on computer vision, pp. 494-509. Springer, 2016.
Scott Workman, Richard Souvenir, and Nathan Jacobs. Wide-area image geolocalization with aerial reference imagery. In Proceedings of the IEEE International Conference on Computer Vision, pp. 3961-3969, 2015.
Hongji Yang, Xiufan Lu, and Yingying Zhu. Cross-view geo-localization with layer-to-layer transformer. Advances in Neural Information Processing Systems, 34, 2021.
Sangdoo Yun, Dongyoon Han, Seong Joon Oh, Sanghyuk Chun, Junsuk Choe, and Youngjoon Yoo. Cutmix: Regularization strategy to train strong classifiers with localizable features. In Proceedings of the IEEE/CVF International Conference on Computer Vision, pp. 6023-6032, 2019.
Amir Roshan Zamir and Mubarak Shah. Accurate image localization based on google maps street view. In European Conference on Computer Vision, pp. 255-268. Springer, 2010.
Menghua Zhai, Zachary Bessinger, Scott Workman, and Nathan Jacobs. Predicting ground-level scene layout from aerial imagery. In Proceedings of the IEEE Conference on Computer Vision and Pattern Recognition, pp. 867-875, 2017.
Sijie Zhu, Taojiannan Yang, and Chen. Revisiting street-to-aerial view image geo-localization and orientation estimation. In Proceed-

(56) References Cited

OTHER PUBLICATIONS ings of the IEEE/CVF Winter Conference on Applications of Computer Vision (WACV), pp. 756-765, Jan. 2021.
Sijie Zhu, Taojiannan Yang, and Chen. Vigor: Cross-view image geo-localization beyond one-to-one retrieval. In Proceedings of the IEEE/CVF Conference on Computer Vision and Pattern Recognition, pp. 3640-3649, 2021.
https://developers.google.com/maps/documentation/maps-static/intro.

* cited by examiner

| | Same-Area | | | | | Cross Area | | | | |
|---|---|---|---|---|---|---|---|---|---|---|
| | R@1 | R@5 | R@10 | R@1% | Hit | R@1 | R@5 | R@10 | R@1% | Hit |
| Siamese-VGG [35] | 18.69 | 43.64 | 55.36 | 97.55 | 21.90 | 2.77 | 8.61 | 12.94 | 62.64 | 3.16 |
| SAFA [21] | 33.93 | 58.42 | 68.12 | 98.24 | 36.87 | 8.20 | 19.59 | 26.36 | 77.61 | 8.85 |
| SAFA+Mining [36] | 38.02 | 62.87 | 71.12 | 97.63 | 41.81 | 9.23 | 21.12 | 28.02 | 77.84 | 9.92 |
| VIGOR [36] | 41.07 | 65.81 | 74.05 | 98.37 | 44.71 | 11.00 | 23.56 | 30.76 | 80.22 | 11.64 |
| **Ours** | **61.48** | **87.54** | **91.88** | **99.56** | **73.09** | **18.99** | **38.24** | **46.91** | **88.94** | **21.21** |

Table 1. Comparison with previous works in terms of retrieval accuracy (%) on VIGOR. Hit means hit rate in [36].

| Method | R@1 | R@5 | R@10 | R@1% |
|---|---|---|---|---|
| CVM-Net [10] | 22.47 | 49.98 | 63.18 | 93.62 |
| Liu [14] | 40.79 | 66.82 | 76.36 | 96.12 |
| Reweight [3] | - | - | - | 98.30 |
| Regmi [19] | 48.75 | - | 81.27 | 95.98 |
| Revisit [35] | 70.40 | - | - | 99.10 |
| SAFA [21] | 81.15 | 94.23 | 96.85 | 99.49 |
| L2LTR [31] | 91.99 | 97.68 | 98.65 | 99.75 |
| • SAFA [21] | 89.84 | 96.93 | 98.14 | 99.64 |
| • Shi [22] | 91.96 | 97.50 | 98.54 | 99.67 |
| • Toker [26] | 92.56 | 97.55 | 98.33 | 99.57 |
| • L2LTR [31] | 94.05 | 98.27 | 98.99 | 99.67 |
| Ours | **94.08** | **98.36** | **99.04** | **99.77** |

Table 2. Comparison with previous works in terms of recall R@k (%) on CVUSA. "•" indicates methods using polar transform.

FIG. 5

| Method | GFLOPs | GPU Memory | Infrence Time per Batch | R@1 |
|---|---|---|---|---|
| • SAFA [21] | 42.24 | 10.82GB | 111ms | 89.84 |
| Ours | **11.32** | **9.85GB** | **99** ms | **94.08** |

Table 3. Comparison with SAFA [21] in terms of GFLOPs. GPU memory, interference speed and performance on CVUSA. Both methods are tested on the same GTX 1080 Ti with batch size of 32 "•" indicates methods that use polar transform.

FIG. 6

| Ablation | VIGOR Same-Area | | | | CVUSA | | | |
|---|---|---|---|---|---|---|---|---|
| | R@1 | R@5 | R@1% | #patches↓ | R@1 | R@5 | R@1% | #patches↓ |
| Stage-1 | 59.80 | 86.82 | 99.53 | 400 | 93.18 | 98.08 | 99.76 | 256 |
| Stage-2 (β = 0.64, γ=1) | 59.44 | 86.32 | 99.50 | **256** | 93.08 | 97.99 | 99.72 | **163** |
| Stage-2 (β = 0.64,γ=1.56) | **61.48** | **87.54** | **99.56** | 400 | **94.08** | **98.36** | **99.77** | 256 |

Table 4. Ablation study on attention-guided non-uniform cropping of our proposed method on VIGOR and CVUSA.

FIG. 7

| Ablation | R@1 | R@5 | R@1% |
|---|---|---|---|
| **VIGOR Same-Area** | | | |
| SAFA [21,36] | 33.93 | 58.42 | 98.24 |
| SAFA+Polar | 24.13 | 45.58 | 95.26 |
| **CVUSA** | | | |
| (Ours) Stage-1 | 93.18 | 98.08 | 99.76 |
| (Ours) Stage-1+Polar | 93.24 | 98.08 | 99.76 |

Table 5. Ablation study on polar transform

FIG. 8

| Ablation | R@1 | R@5 | R@1% |
|---|---|---|---|
| **VIGOR Same-Area** | | | |
| TransGeo w/o ASAM | 52.65 | 78.29 | 98.17 |
| TransGeo | 61.48 | 87.54 | 99.56 |
| **CVUSA** | | | |
| TransGeo w/o ASAM | 90.92 | 97.03 | 99.44 |
| TransGeo | 94.08 | 98.36 | 99.77 |

Table 6. Ablation study on ASAM

Visualization of the attention maps and correlation intensity in the first and last layer of our transformer encoders

| Ablation | R@1 | R@5 | R@1% |
|---|---|---|---|
| Fixed Pos. Emb. | 42.72 | 68.76 | 94.40 |
| Learnable Pos. Emb. | 93.18 | 98.08 | 99.76 |

Table 7. Ablation study on different position embeddings on CVUSA in terms of Recall

FIG. 11

| Ablation | Res. | R@1 | R@5 | R@1% |
|---|---|---|---|---|
| $\beta = 0.53, \gamma = 1$ | 256 | 92.80 | 97.87 | 99.73 |
| $\beta = 0.64, \gamma = 1$ | 256 | 93.08 | 97.99 | 99.72 |
| $\beta = 0.79, \gamma = 1$ | 256 | 93.10 | 98.03 | 99.75 |
| $\beta = 0.53, \gamma = 1.88$ | 352 | 93.81 | 98.36 | 99.79 |
| $\beta = 0.64, \gamma = 1.56$ | 320 | **94.08** | **98.36** | **99.77** |
| $\beta = 0.79, \gamma = 1.26$ | 288 | 93.83 | 98.19 | 99.77 |

Table 8. Ablation study for different $\beta$ and $\gamma$ on CVUSA.

FIG. 12

| | L2LTR [31] | **TransGeo** (Ours) |
|---|---|---|
| Architecture | CNN+Transformer | Transformer |
| GFLOPs | 44.06 | 11.32 |
| GPU Memory | 32.16G | 9.85G |
| Pretrain | ImageNet-21k | ImageNet-1K |
| Best Accuracy | 94.05 | 94.08 |

Table 9. Head-to-head comparison between TransGeo and L2LTR

FIG. 13

| Method | R@1 | R@5 | R@10 | R@1% |
|---|---|---|---|---|
| CVM-Net [10] | 20.15 | 45.00 | 56.87 | 87.57 |
| Liu [14] | 46.96 | 68.28 | 75.48 | 92.01 |
| SAFA [21] | 78.28 | 91.60 | 93.79 | 98.15 |
| L2LTR [31] | 83.14 | 93.84 | 95.51 | 98.40 |
| +SAFA [21] | 81.03 | 92.80 | 94.84 | 98.17 |
| +Shi [22] | 82.49 | 92.44 | 93.99 | 97.32 |
| +Toker [26] | 83.28 | 93.57 | 95.42 | 98.22 |
| +L2LTR [31] | 84.89 | **94.59** | **95.56** | **98.37** |
| Ours | **84.95** | 94.14 | 95.78 | 98.37 |

Table 10. Comparison with previous works in terms of R@k (%) on CVACT-val. "+" indicates methods using polar transform

FIG. 14

| | Same-Area | | | | Cross-Area | | | |
|---|---|---|---|---|---|---|---|---|
| | R@1 | R@5 | R@10 | R@1% | R@1 | R@5 | R@10 | R@1% |
| VIGOR [36] | 19.10 | 42.13 | - | 95.12 | 1.41 | 4.52 | - | 44.60 |
| **TransGeo** | **47.69** | **79.77** | **86.36** | **99.29** | **5.54** | **14.22** | **19.63** | **66.93** |

Table 11. Performance of TransGeo and previous work [36] on VIGOR dataset with unknown orientation.

FIG. 15

| | *FoV* = 180° | | | | *FoV* = 90° | | | |
|---|---|---|---|---|---|---|---|---|
| | R@1 | R@5 | R@10 | R@1% | R@1 | R@5 | R@10 | R@1% |
| DSM [22] | 48.53 | 68.47 | 75.63 | 93.02 | 16.19 | 31.44 | 39.85 | 71.13 |
| TransGeo | **58.22** | **81.33** | **87.66** | **98.13** | **30.12** | **54.18** | **63.96** | **89.18** |

Table 12. Performance of TransGeo and previous methods on CVUSA with limited FoV (Field of View) and unknown orientation.

FIG. 16

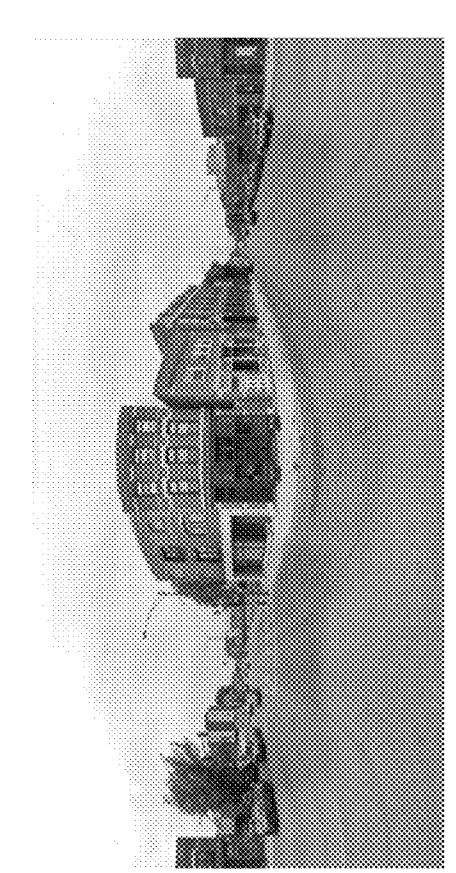
(a) Street-view Query
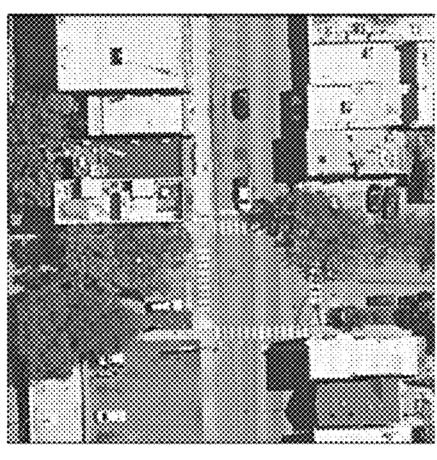
(b) Arial-view Reference
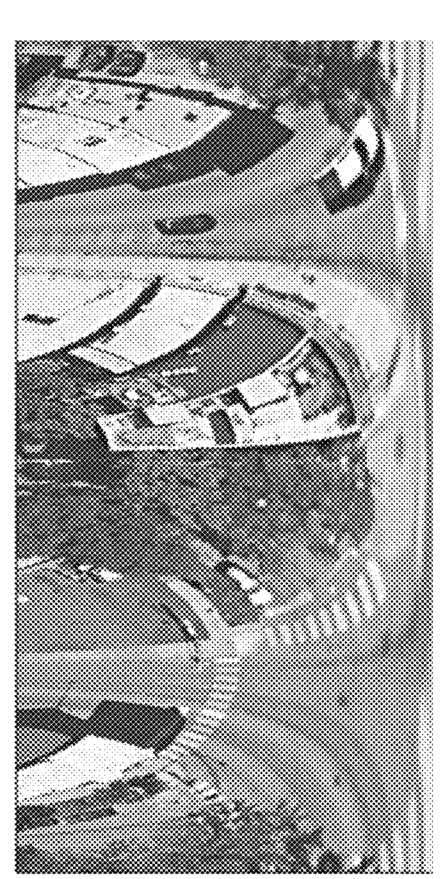
(c) Polar Transform
(d) Polar Transform w/ Alignment
FIG. 17

Examples of attention map and non uniform crop on CVUSA

Qualitative result on CVUSA. Red box indicates ground-truth in retrieved results. the ground truth is ranked at 1, 2, 6, 148 for four queries respectively Qualitative result on VIGOR. Red box indicates ground-truth in retrieved results. the ground truth is ranked at 1, 2, 9, 165 for four queries respectively

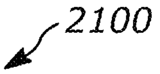
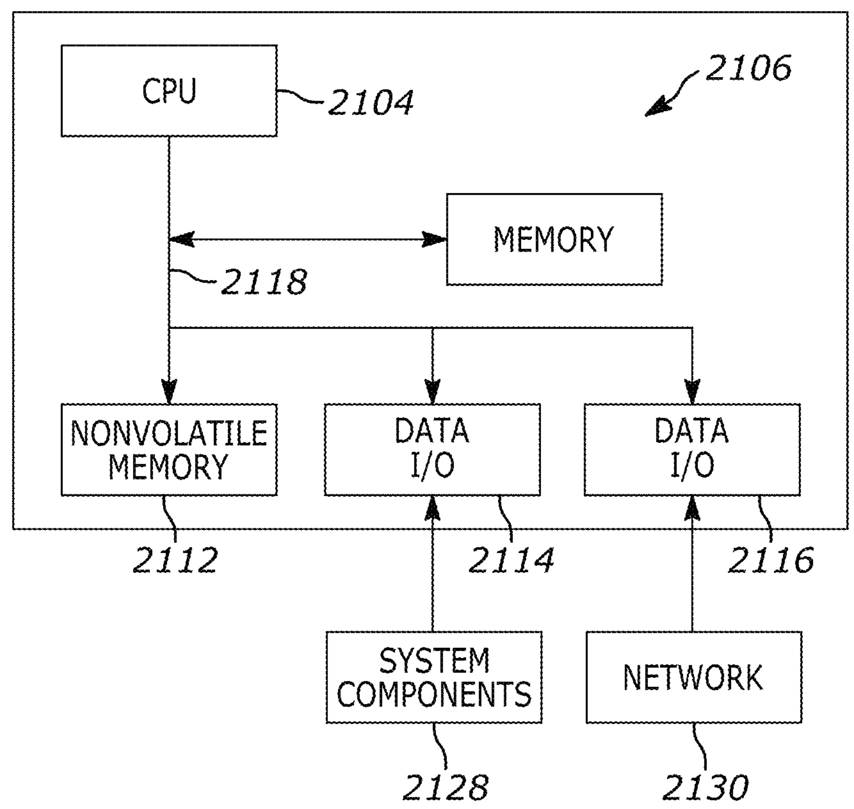
FIG. 21

CROSS-VIEW IMAGE GEO-LOCALIZATION

CROSS-REFERENCE TO RELATED APPLICATIONS

This application claims priority to and is a continuation in part of U.S. Patent Provisional Patent Application 63/488,548 filed on Mar. 6, 2023, entitled "Cross-View Image Geo-Localization", the teaching of this patent application is hereby incorporated by reference in their entirety.

FEDERALLY SPONSORED RESEARCH AND DEVELOPMENT

This invention was made with Government support under National Science Foundation Award No.: 1910844. The Government has certain rights in the invention.

DISCLOSURES BY THE INVENTOR OR A JOINT INVENTOR

The following disclosure is submitted under 35 U.S.C. § 102(b)(1)(A). The first document by co-inventors, entitled TransGeo: Transformer Is All You Need for Cross-view Image Geo-localization, was uploaded to the website arXiv.org, on Mar. 31, 2022, arXiv preprint arXiv:2204:00097v1. This document by the co-inventors is hereby incorporated by reference in its entirety, including the code referenced in the co-inventors' paper.

BACKGROUND

The present application generally relates to image processing and, more particularly, to cross-view image geo-localization.

This application includes references denoted in brackets with numbers, e.g., [x], where x is a number. This numeric listing of the references is found at the end of this application. Further, these references are listed in the information disclosure statement (IDS) filed herewith. The teachings of each of these listed references are hereby incorporated hereinto by reference in their entirety.

Image-based geo-localization aims to determine the location of a query street-view image by retrieving the most similar images in a GPS-tagged reference database. It has great potential for noisy GPS correction [1, 32] and navigation [16, 13] in crowded cities. Due to the complete coverage and easy access of aerial images from Google Map API [36], a thread of works [28, 24, 9, 12, 20, 34, 22, 21, 18] focuses on cross-view geo-localization, where the satellite/aerial images are collected as reference images for both rural [33, 12] and urban areas [28, 35]. They generally train a two-stream CNN (Convolutional Neural Network) framework employing metric learning loss [9, 34]. However, such cross-view retrieval systems suffer from the great domain gap between street and aerial views, as CNNs do not explicitly encode the position information of each view.

To bridge the domain gap, recent works apply a pre-defined polar transform [20, 21, 25] on the aerial-view images. The transformed aerial images have a similar geometric layout as the street-view query images, which results in a significant boost in the retrieval performance. However, the polar transform relies on the prior knowledge of the geometry corresponding to the two views and may fail when the street query is not spatially aligned at the center of aerial images [35] (this point is further demonstrated in the section entitled "Ablation Study"). Recently, the vision transformer [6] has achieved significant performance on various vision tasks due to its powerful global modeling ability and self-attention mechanism. Although CNN-based methods are still predominant for cross-view geo-localization, the presently claimed invention of the vision transformer is more suitable for this task due to three advantages: 1) Vision transformer explicitly encodes the position information, thus can directly learn the geometric correspondence between two views with the learnable position embedding. 2) The multi-head attention [27] module can model global long-range correlation between all patches starting from the first layer, while CNNs have limited receptive field [6] and only learn global information in top layers. Such strong global modeling ability can help learn the correspondence when two objects are close in one view while far from each other in the other view. 3) Since each patch has an explicit position embedding, it is possible to apply non-uniform cropping, which removes arbitrary patches without changing the input of other patches, while CNNs can only apply uniform cropping (cropping a rectangle area). Such flexibility in patch selection is beneficial for geo-localization. Since some objects in aerial-view may not appear in street view due to occlusion, they can be removed with non-uniform cropping to reduce computation and GPU memory footprint while keeping the position information of other patches.

However, the vanilla vision transformer [6] (ViT) has some limitations on training data size and memory consumption, which must be addressed when applied to cross-view geo-localization. The original ViT [6] requires extremely large training datasets to achieve state-of-the-art, JFT-300M [6] or ImageNet-21k [4] (a superset of the original ImageNet-1K). It does not generalize well if trained on medium-scale datasets, because it does not have inductive biases [6] inherent in CNNs, shift-invariance, and locality. Recently, DeiT [26] has applied strong data augmentation, knowledge distillation, and regularization techniques in order to outperform CNN on ImageNet-1K [4], with similar parameters and inference throughput. However, mix up techniques used in DeiT (CutMix [26, 31]) are not straightforward for metric learning losses [9].

SUMMARY OF THE INVENTION

The dominant CNN-based methods for cross-view image geo-localization rely on polar transform and fail to model global correlation. Disclosed is a pure transformer-based approach (TransGeo) to address these limitations from a different perspective. TransGeo takes full advantage of the strengths of the transformer related to global information modeling and explicit position information encoding. The claimed invention further leverages transformer input's flexibility and discloses an attention-guided non-uniform cropping method so that uninformative image patches are removed with a negligible drop in performance to reduce computation cost. The saved computation can be reallocated to increase resolution only for informative patches, resulting in performance improvement with no additional computation cost. This "attend and zoom-in" strategy is highly similar to human behavior when observing images. Remarkably, TransGeo achieves state-of-the-art results on both urban and rural datasets, with significantly less computation cost than CNN-based methods. It does not rely on polar transform and infers faster than CNN-based methods.

Disclosed is a novel system and cross-view image geo-localization method. The system operates on an information processor such as a computer. There are two stages of operation. The first stage operation acquires ground-view images and aerial-view images of a geographical position, the aerial-view images are at a first resolution. A first training set is established using each of the ground-view images and its corresponding ground-truth aerial image. A ground-view image transformer-encoder is trained with the first training set to produce ground-view image transformer/encoder weights. In one example, the training the ground-view image transformer-encoder further includes training with a first set of class tokens to integrate classification information. In another example, the training the first aerial-view image transformer-encoder further includes training with a second set of class tokens to integrate classification information.

Next, a first aerial-view image transformer-encoder is trained with the first training set to produce a first set of aerial-view image encoder weights.

The second stage operation for building an attention map of the aerial-view images using the aerial-view image encoder weights. A second resolution of the aerial-view images is accessed at the second resolution is higher resolution than the first resolution. In one example, the higher resolution is a separately captured image of the aerial view images. In another example, the higher resolution is created from the lower resolution images using "up-sampling", sometimes referred to "super-resolution". In yet another example, the lower resolution image is a downs-sampling of the higher resolution image. In one example the building the attention map of the aerial-view images using the aerial-view image encoder weights includes the second set of class tokens. In another example, the training the second aerial-view image transformer-encoder further includes training with a third set of class tokens to integrate classification information.

The attention map is applied to perform non-uniform cropping of the aerial-view images at the second resolution. A second training set is established using each of the first set of area-view image transformer-encoder weights and the aerial-view images at the second resolution. A second aerial-view image transformer-encoder is trained with the second training set.

In another example, the first stage operation, the second stage operation, or both do not use polar transforms. In yet another example, the first stage operation, the second stage operation, or both do not use data augmentation.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is Table 2 illustrating a comparison with previous works in terms of Recall R@k (%) on CVUSA. "†" indicates methods using polar transform, according to one aspect of the present invention;

FIG. 6 is Table 3 illustrating a Comparison with SAFA in terms of GFLOPs, GPU memory, inference speed and performance on CVUSA. Both methods are tested on the same GTX 1080 Ti with batch size of 32. "†" indicates methods that use polar transform, according to one aspect of the present invention;

FIG. 7 is Table 4 illustrating an ablation study on attention-guided non-uniform cropping of the claimed invention on VIGOR and CVUSA, according to one aspect of the present invention;

FIG. 8 is Table 5 illustrating an ablation study on Ablation study on polar transform, according to one aspect of the present invention;

FIG. 11 is Table 7 illustrating an ablation study on different position embeddings on CVUSA in terms of Recall, according to one aspect of the present invention;

FIG. 12 is Table 8 illustrating an ablation study for different β and γ on CVUSA, according to one aspect of the present invention;

FIG. 13 is Table 9 illustrating a head-to-head comparison between TransGeo and L2LTR, according to one aspect of the present invention;

FIG. 14 is Table 10 illustrating a comparison with previous works in terms of R@k (%) on CVACT-val. "†" indicates methods using polar transform, according to one aspect of the present invention;

FIG. 15 is Table 11 illustrating a performance of TransGeo and previous work [36] on VIGOR dataset with unknown orientation, according to one aspect of the present invention;

FIG. 16 is Table 12 illustrating a performance of TransGeo and previous methods on CVUSA with limited FoV (Field of View) and unknown orientation, according to one aspect of the present invention;

FIG. 17 is an example of polar transform on VIGOR, in which the red star denotes the location of the street query in the aerial image, according to one aspect of the present invention;

FIG. 21 illustrates a block diagram illustrating a processor, according to an example.

DETAILED DESCRIPTION

Non-Limiting Definitions

Figure 1:
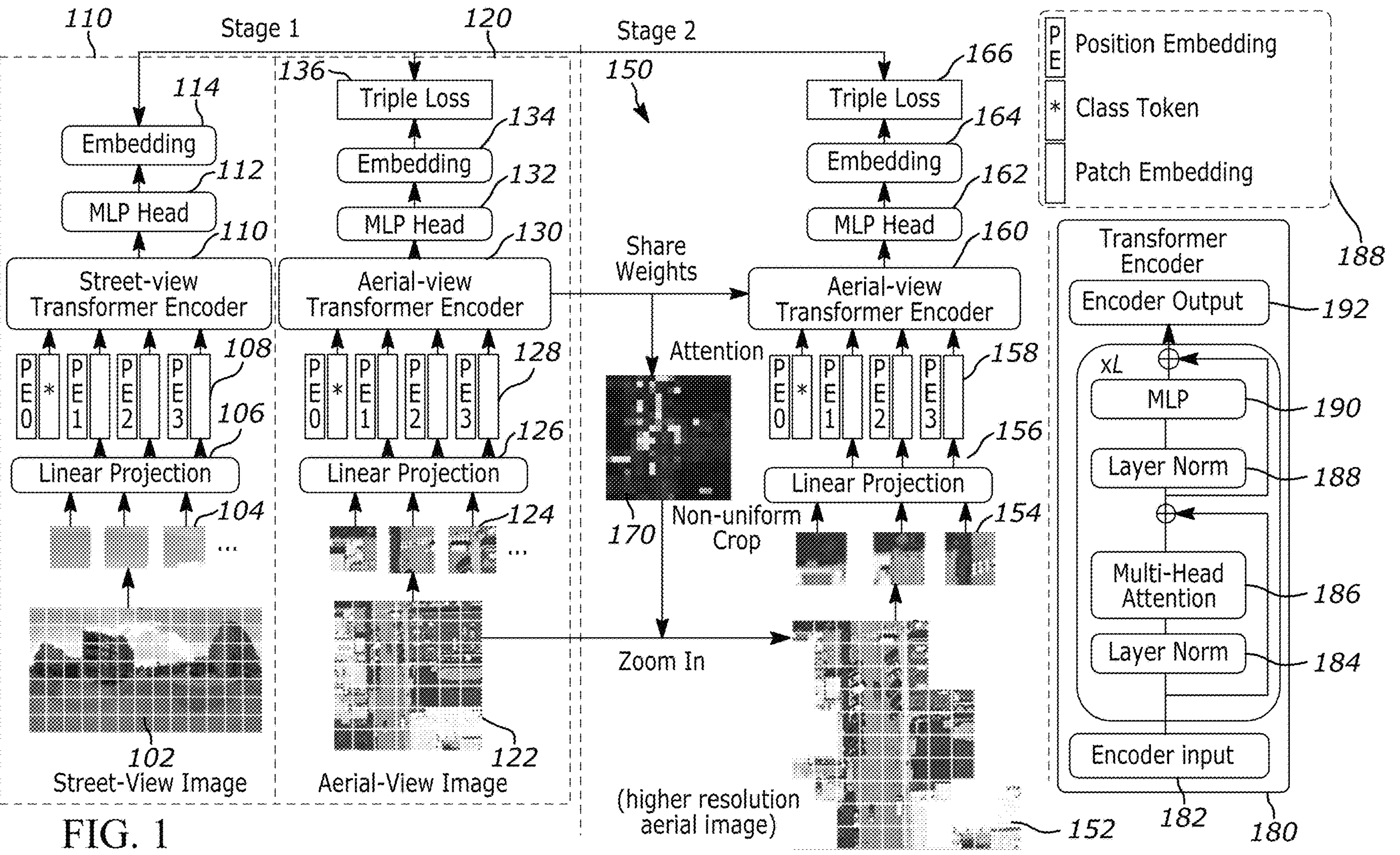
FIG. 1 is a diagram of an overall method to carry out aspects of the present invention.

The terms "a", "an" and "the" are intended to include the plural forms as well, unless the context clearly indicates otherwise.

The phrases “at least one of <A>, <B>, . . . and <N>” or “at least one of <A>, <B>, . . . <N>, or combinations thereof” or “<A>, <B>, . . . and/or <N>” are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term “down-sampling” is the reduction in spatial resolution while keeping the same two-dimensional (2D) representation. It is typically used to reduce the storage and/or transmission requirements of images.

The term “ground truth” in machine learning refers to the goal that you want to model with your supervised machine learning algorithm. Ground truth is also known as the target for training or validating the model with a labeled dataset.

The term “image” refers to a spatial pattern of physical light comprised of known colors of the light spectrum, which may or may not be visible to the human eye.

The term “light” is electromagnetic radiation that includes both visible and non-visible portions of the light spectrum.

The term MLP (Multilayer Perceptron) is a fully connected class of feedforward artificial neural network (ANN).

The term “positive pair” is where each street-view image and its ground-truth aerial image are considered as a positive pair, other pairs are considered as negative.

The term “up-sampling”, sometimes referred to a “super-resolution”, is the increasing of the spatial resolution while keeping the 2D representation of an image.

Overview

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

One aspect of this patent is disclosing the first pure transformer-based method for cross-view geo-localization (TransGeo). Adaptive Sharpness-Aware Minimization (ASAM) [10] is incorporated to make the method of the presently claimed invention more flexible without relying on data augmentations. The use of ASAM avoids overfitting to local minima by optimizing the adaptive sharpness of loss landscape and improves model generalization performance. Moreover, by analyzing the attention map of the top transformer encoder, the inventors discovered that most of the occluded regions in aerial images have a negligible contribution to the output. The attention-guided non-uniform cropping is introduced, which first attends to informative image regions based on the attention map of the transformer encoder, then increases the resolution only on the selected regions, resulting in an “attend and zoom-in” procedure, similar to human vision. The claimed invention achieves state-of-the-art performance with significantly less computation cost (GFLOPs) than CNN-based methods, SAFA [20].

The claimed invention includes the following contributions:

- The first pure transformer-based method (TransGeo) for cross-view image geo-localization, without relying on polar transform or data augmentation.
- A novel attention-guided non-uniform cropping strategy that removes a large number of uninformative patches in reference aerial images to reduce computation with negligible performance drop. The performance is further improved by reallocating the saved computation to higher image resolution of the informative regions.
- State-of-the-art performance on both urban and rural datasets with less computation cost, GPU memory consumption, and inference time than CNN-based methods.

Related Work

Cross-view Geo-localization—Existing works for cross-view geo-localization [11, 29, 28, 24, 9, 12, 2] generally adopt a two-stream CNN framework to extract different features for two views, then learn an embedding space where images from the same GPS location are close to each other. However, they fail to model the significant appearance gap between two views, resulting in poor retrieval performance. Recent methods either leverage polar transform [20, 21, 25] or add an additional generative model [18, 25] (GAN [7]) to reduce domain gap by transforming images from one view to the other. SAFA [20] designs a polar transform based on the prior geometric knowledge of the two views so that the transformed aerial images have layouts similar to street-view images. Toker [25] further trains a generative network on the top of polar transform so that the generated images are more realistic for matching. However, they highly rely on the geometric correspondence of the two views.

On the other hand, several works start to consider practical scenarios where the street-view and aerial-view images are not perfectly aligned in terms of orientation and spatial location. Shi [21] discloses a Dynamic Similarity Matching module to account for orientation while computing the similarity of image pairs. Zhu [34] adopt improved metric learning techniques and leverages an activation map for orientation estimation. VIGOR [35] discloses a new urban dataset assuming that the query can occur at arbitrary locations in a given area, so the street-view image is not spatially aligned at the center of aerial image. In such cases, polar transform may fail to model the cross-view correspondence due to unknown spatial shift and strong occlusion. As described below, the vision transformer of the claimed invention can tackle this challenging scenario with learnable position embedding on each input patch (See section entitled “Related Work”).

The inventors observed that L2LTR [30] adopts vanilla ViT [6] on the top of ResNet [8], resulting in a hybrid CNN+transformer approach. Since it adopts CNN as a feature extractor, the self-attention and position embedding are only used on the high-level CNN features, which does not fully exploit the global modeling ability and position information from the first layer. Besides, as noted in their paper, it requires significantly larger GPU memory [30] and pretraining dataset than CNN-based methods, while the claimed invention enjoys GPU memory efficiency and uses the same pretraining dataset as CNN-based methods, SAFA [20]. The claimed invention is compared with their method in Sec. 4.3. More comparisons are also included in supplementary materials.

Vision Transformer—Transformer [27] is originally disclosed for large-scale pretraining in NLP. It is first introduced for vision tasks in ViT [6] as vision transformer. ViT divides each input image into k×k small patches, then considers each patch as one token along with position embedding and feeds them into multiple transformer encoders. It requires extremely large training datasets to outperform CNN counterparts with similar parameters, as it does not have inductive biases inherent in CNNs. DeiT [26] is recently disclosed for data-efficient training of vision transformer. It outperforms CNN counterparts on medium-scale datasets, ImageNet [4], by strong data augmentation and regularization techniques. A very recent work [3] further reduces the augmentations to only inception-style augmentations [23]. However, even random crop could break the spatial alignment, and previous works on cross-view geo-localization generally do not use any augmentation. The presently claimed invention provides a design of a generic framework for cross-view geo-localization without any augmentation, thus introduce a strong regularization technique, ASAM [10], to prevent vision transformer from overfitting.

Method

The problem is first formulated. Next, an overview of the novel approach is described in the section entitled "Problem Statement and Method Overview". Then, in the section entitled "Vision Transformer for Geo-Localization", the vision transformer components are described. The disclosed attention-guided non-uniform cropping strategy is presented in the section entitled "Attention-guided Non-Uniform Cropping", which removes a large portion of patches (tokens) while maintaining retrieval performance. Finally, the regularization technique (ASAM [10]) is introduced in the section entitled "Model Optimization" for model training.

Problem Statement and Method Overview

Given a set of query street-view images $\{I_s\}$ 102 and aerial-view reference images {Ia}104, an embedding space is learned in which each street-view query $I_s$ is close to its corresponding ground-truth aerial image $I_a$. Each street-view image and its ground-truth aerial image are considered as a positive pair, other pairs are considered as negative. If there are multiple aerial images covering one street-view image, VIGOR dataset [35], the nearest one is considered as the positive, and avoid sampling the other neighboring aerial images in the same batch to prevent ambiguous supervision.

Overview of Method. As shown in FIG. 1, two separate transformer encoders 110, 120 are trained as part of a Stage 1 100, $T_s$, $T_a$, to generate embedding features for street 110 and aerial views 130, respectively. The model is trained with soft-margin triplet loss [9] 136:

$$\mathcal{L}_{triplet} = \log\left(1 + e^{\alpha(d_{pos} - d_{neg})}\right). \tag{1}$$

Here $d_{pos}$ and $d_{neg}$ denote the squared $l_2$ distance of the positive and negative pairs. In a mini-batch with N street-view and aerial-view image pairs, an exhaustive strategy [19] is adopted to sample 2N(N−1) triplets. Next a $l_2$ normalization is applied on all the output embedding features 114, 134.

FIG. 1 shows the overall pipeline. Stage 1 applies regular training with Eq. 1. In stage 2 150, the attention map 170 of aerial images 122 is adopted as guidance and performs non-uniform cropping (section entitled "Attention-guided Non-Uniform Cropping"), which removes a large number of uninformative patches in reference aerial images. The saved computation is reallocated for higher image resolution only on important regions.

In one example, the higher resolution is a separately captured image of the aerial view images. In another example, the higher resolution is created from the lower resolution images using "up-sampling", sometimes referred to "super-resolution". In yet another example, the lower resolution image is a downs-sampling of the higher resolution image.

Vision Transformer for Geo-Localization

The vision transformer [6] components are described that are adopted in the claimed invention method, patch embedding, position embedding, and multi-head attention.

Patch Embedding—104, 106, 124, 126, 154, 156: Given the input images $I \in \mathbb{R}^{H \times W \times C}$, the patch embedding block converts them into a number of tokens as the input 108, 128, 158 of transformer encoders 110, 130, 160 as detailed in 180. Here H, W, C denote the height, width, and channel numbers of I. As shown in FIG. 1, images are first divided into N P×P patches (in this example use P=16), $I_p \in \mathbb{R}^{N \times (P \times P \times C)}$. All the N patches are further flattened as $\mathbb{R}^{N \times P^2 C}$ and fed into the trainable linear projection layer to generate N tokens, $I_t \in \mathbb{R}^{N \times D}$. D is the feature dimension of transformer encoder.

Class Token—108, 128, 158 with legend 188: In addition to the N image tokens, ViT [6] adds an additional learnable class token following BERT [5], to integrate classification information from each layer. The output class token of the last layer is then fed into an MLP (Multilayer Perceptron) head to generate the final classification vector. The final output vector is used as the embedding feature and train it with the loss in Eq. 1.

Learnable Position Embedding—114, 134, 164: Position embedding is added to each token to maintain the positional information. The learnable position embedding in ViT [6] is adopted, which is a learnable matrix $\mathbb{R}^{(N+1) \times D}$ for all the (N+1) tokens, including a class token. The learnable position embedding enables the disclosed two-stream transformer to explicitly learn the best positional encoding for each view without any prior knowledge of the geometric correspondence and, thus, is more generic and flexible than CNN-based methods. The inventors observed that the position embedding also makes it possible to remove arbitrary tokens without changing the position information of other tokens. Therefore, non-uniform cropping is successfully employed.

Multi-head Attention: On the right of FIG. 1, the inner architecture, 184 through 190, of the transformer encoder 180 is shown, which is L cascaded basic transformer blocks. The key component is the multi-head attention block 186. It first uses three learnable linear projections to convert the input into query, key, and value, denoted as Q, K, V with dimension D. The attention output is then computed as $\mathrm{softmax}(QK^T/D)V$. A k-head attention block performs the linear projection to Q, K, V with k different heads. The attention is then performed in parallel for all the k heads. The outputs are concatenated and projected back to the model dimension D. The multi-head attention block 186 can model a strong global correlation between any two tokens starting from the first layer, which is not possible to learn in CNNs due to the limited receptive field of convolution. However, note that the computation complexity is $\theta(N^2)$, a large number of tokens will have a large computation cost. In other words, reducing the number of tokens is desirable to save computation.

Attention-Guided Non-Uniform Cropping

When looking for cues for image matching, humans generally take the first glance to find the most important regions, then attend to only the important regions and zoom-in to find more details with high resolution. For cross-view geo-localization, the "attend and zoom-in" procedure can be more beneficial because two views only share a small number of visible regions. Many regions in one view, e.g., the roof of tall buildings in aerial view, may be invisible in the other views, thus contributing negligibly to the final similarity as shown in FIG. 2.

Figures 2, 3:
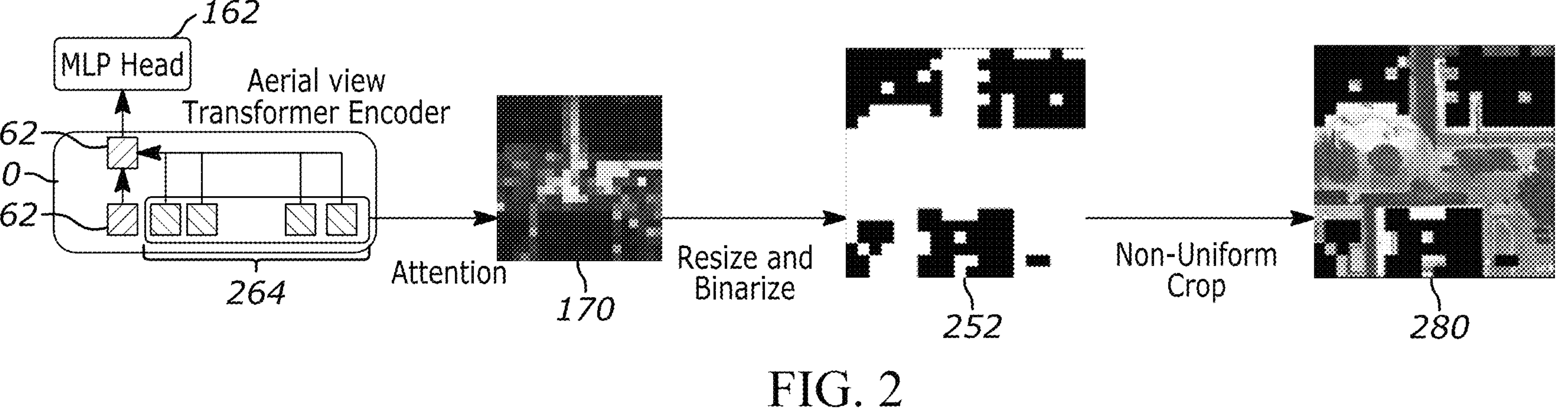
FIG. 2 is a diagram of a pipeline of the disclosed attention-guided non-uniform cropping scheme, according to one aspect of the present invention.
FIG. 3 is Table 1 illustrating a comparison with previous works in terms of retrieval accuracy (%) on VIGOR, according to one aspect of the present invention.

FIG. 2 illustrates a pipeline of the attention-guided non-uniform cropping scheme. The box 262 indicates the class token. The other boxes 264 indicate patch tokens. The patches shown in black 252 are not selected in the input.

Those regions may be removed to reduce the computation and memory costs. However, important regions are often scattered across the image. Therefore, the uniform cropping (rectangular areas) in CNNs cannot remove scattered regions, as the cropped image must be rectangular. Disclosed is the attention-guided non-uniform cropping 280 in the claimed pure transformer architecture.

As shown in FIG. 2, the attention map is employed in the last transformer encoder of aerial-view branch 120, because it represents the contribution of each token to the final output. Since only the output corresponding to the class token is connected with the MLP head, the correlation is selected between the class token and all other patch tokens as the attention map and reshape to the original image shape. In the example of FIG. 2, the important regions mainly belong to the street area, and the other buildings occluded in the street-view mostly have a low attention score. What portion of patches, $\beta$ (64%), to maintain after cropping is determined.

To zoom-in for more detailed information, the patch size is maintained and increase the image resolution by $\sqrt{\gamma}$ times to have $\gamma$ times of patches. The attention map is resized and binarized based on $\gamma$ and $\beta$, respectively, resulting in $\gamma\beta N$ patches after cropping (FIG. 2).

If $\beta\times\gamma=1$, then the final number of tokens will be the same as the disclosed stage-1 baseline model. Use $\gamma=1$ in this example to merely reduce the number of tokens without increasing resolution, therefore improving the computation efficiency. In practice, the attention maps only need to be computed once and can be saved during the stage-1 training, thus, do not introduce additional computation cost. Since the street-view branch is unchanged, the inference speed for street-view query is the same as the stage-1 model, which is faster than typical CNN-based methods (see details in the section entitled "Computational Costs").

Model Optimization

To train the disclosed transformer model without augmentation, a strong regularization/generalization technique is adopted, ASAM [10]. While optimizing the main loss in Eq. 1, ASAM is used to minimize the adaptive sharpness of the loss landscape so that the model converges with a smooth loss curvature to achieve a strong generalization ability. For a given loss function $\mathcal{L}$ and parameter weights $w \in \mathbb{R}^k$, the sharpness of loss is defined as:

$$* \max_{|\epsilon|_2<\rho} \mathcal{L}(w+\epsilon) - \mathcal{L}(w), \tag{2}$$

which is the maximal value in a $l_2$ ball region with radius $\rho$. $\epsilon$ is the perturbation on parameter weights w and $\|_2$ means $l_2$ norm. Kwon [10] finds that the sharpness is dependent on the scale of weights. In other words, any scaling factor A on w with no effect on loss $\mathcal{L}$ can change the sharpness of loss. Kwon then finds a family of invertible linear operators $$\{T_w \in \mathbb{R}^k \mid T_{AW}^{-1} = T_w^{-1}\}$$

as normalization operations to cancel out the effect of scaling A. Then, the adaptive sharpness is defined as:

$$* \max_{|T_w^{-1}\epsilon|_2<\rho} \mathcal{L}(w+\epsilon) - \mathcal{L}(w). \tag{3}$$

Such scale-independent sharpness is highly beneficial for transformers, as the weight scales vary dramatically in transformer encoders due to strong self-attention with softmax. By simultaneously minimizing the loss in Eq. 1 and adaptive sharpness in Eq. 3, to overcome the overfitting issue without using any data augmentation.

Experimental Results

Datasets and Evaluation Metrics

The inventors conducted experiments on two city-scale datasets, CVUSA [33] and VIGOR [35], to evaluate the claimed invention on both rural and urban scenarios. They represent spatially aligned (CVUSA) and unaligned (VIGOR) settings as a complete coverage on popular settings and practical needs.

CVUSA: The CVUSA (Cross-View USA) [29] dataset is originally disclosed for large-scale localization across the U.S., containing more than 1 million of ground-level and aerial images. Zhai [33] uses the camera's extrinsic parameters to align image pairs by warping the panoramas. This subset has 35,532 image pairs for training and 8,884 image pairs for testing. This subset is used in our experiments by following previous works [33, 9, 20].

VIGOR: VIGOR [35] originally contains 238,696 panoramas and 90,618 aerial images from four cities: Manhattan, San Francisco, Chicago, and Seattle. A balanced sampling is applied to select only two positive panoramas for each satellite image, resulting in 105,214 panoramas. VIGOR assumes that the queries can belong to arbitrary locations in the target area and thus is not spatially aligned to the center of any aerial reference images in both training and test sets. It has two evaluation protocols [35], same-area and cross-area. Besides, VIGOR provides the raw GPS, which allows meter-level evaluation. The setting of VIGOR with both same-area and cross-area protocols is followed.

Evaluation Metrics: The retrieval performance is reported in terms of top-k recall accuracy, denoted as "R@k". The k nearest reference neighbors in the embedding space are retrieved based on cosine similarity for each query. If the ground-truth reference image appears in the top k retrieved images, it is considered as correct. In addition, the real-world distance is computed between the predicted and ground-truth GPS locations as meter-level evaluation on VIGOR [35] dataset. Following VIGOR [35], the hit rate is also reported, which is the percentage of top-1 retrieved reference images covering the query image (including the ground-truth).

Implementation Details

One aspect of the claimed invention is implemented in pytorch [17]. For CVUSA, panoramas and aerial images are resized to 112×616 and 256×256 before feeding into the disclosed model with a batch size of 32, following [20]. For VIGOR, panoramas and aerial images respectively are resized to 640×320 and 320×320 with batch size of 16, following [35]. The patch size is 16×16, and the feature dimension is 384. In this example, 12 transformer encoders are used with 6 heads for each multi-head attention block. The model is initialized with off-the-shelf pre-trained weights [26] on ImageNet-1K [4]. AdamW [15] optimizer is used with learning rate of 0.0001 based on cosine scheduling [14]. The weight ($\alpha$ in Eq. 1) of soft-margin triplet loss [9]

is set to 10. More details are available in supplementary materials. The dimension of the final embedding feature is 1,000, which is much smaller than typical CNN-based methods, 4,096 in SAFA [20].

Comparison with State-of-the-Art

VIGOR: The disclosed transformer-based method is more advantageous to VIGOR, where the two views are not perfectly aligned in terms of spatial location, due to the strong global modeling and learnable position embedding. As shown in Table 1 in FIG. 3, the disclosed method significantly outperforms previous state-of-the-art methods. The relative improvement respectively is 49.7% and 72.6% for the same-area and cross-area protocols over VIGOR on R@1, indicating the strong learning capacity and robustness to cross-city distribution shift (cross-area setting uses different sites for training and testing).

Figure 4:
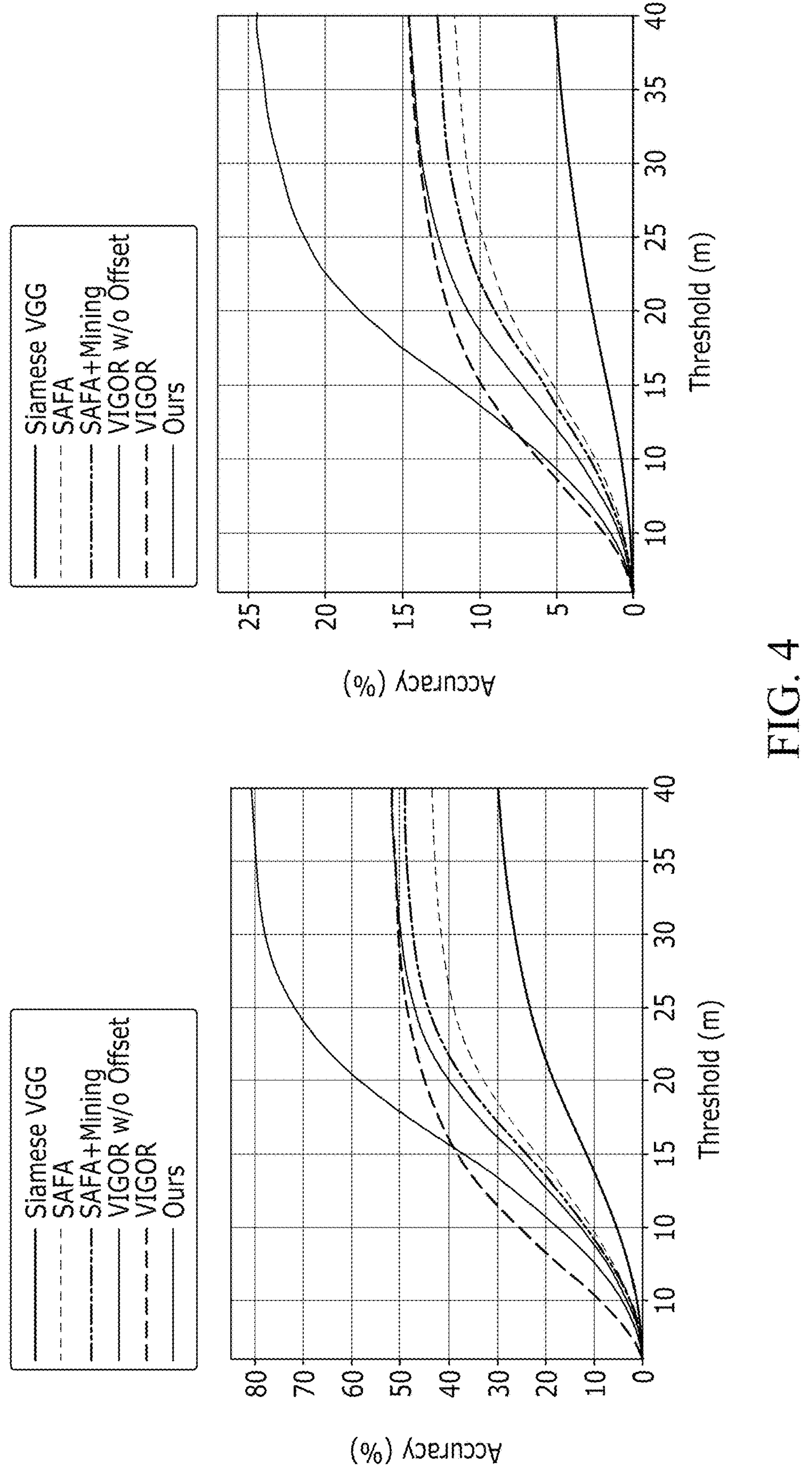
FIG. 4 are graphs of same-area (left) and cross-area (right) meter-level localization accuracy of previous works and the disclosed method, according to one aspect of the present invention.

Meter-level Evaluation: Since the final goal of localization is to get a small localization error in terms of distance (meters), the meter-level evaluation is conducted following [35]. Different thresholds are applied in terms of meters and compute the corresponding accuracy when the distance between the predicted and ground-truth GPS is smaller than the threshold. As shown in FIG. 4, the disclosed method significantly outperforms previous works on both settings, especially for threshold>20 m. A slightly higher accuracy [35] on VIGOR is observed for extremely small thresholds, due to an extra branch predicting the offset for the aerial image. Removing the offset from VIGOR for a fair comparison as "VIGOR w/o Offset", then the disclosed method outperforms "VIGOR w/o Offset" on all thresholds. Adopting the offset prediction in the future to improve the localization on small thresholds.

CVUSA: In Table 2 in FIG. 5, one aspect of the disclosed method with previous state-of-the-art methods is compared. Note that claimed invention does not use polar transform, and methods with polar transform are marked with "†". The claimed invention achieves state-of-the-art compared to all previous works, and outperforms methods w/o polar transform by a large margin, demonstrating the superiority of pure transformer based methods over CNN-based methods. Note that L2LTR [30] uses a significantly larger GPU memory and pretraining dataset than the disclosed method. The claimed invention is much more efficient with better performance. The performance can be further improved with a larger model. Detailed comparison on computation cost is provided in the section entitled "Computational Costs". Additional results for CVACT [12], unknown orientation, and limited field of view are provided in supplementary materials.

Computational Cost

In Table 4 in FIG. 6, a detailed computation comparison between the disclosed method and a state-of-the-art CNN-based method is provided, SAFA [20]. This appears to be the first cross-view geo-localization work that reports a detailed comparison of computational cost, which is an important algorithmic aspect that has been completely overlooked in the previous geo-localization literature. SAFA is selected because it does not have additional blocks like [18, 25], thus has relatively low computation among all CNN-based methods. Authors in [30] report that their method requires a significantly larger GPU memory and pretraining dataset (ImageNet-21K used in ViT [6]) than CNN-based methods, as it uses vanilla ViT on the top of ResNet [8]. Therefore, the claimed invention is guaranteed to be more efficient if the computation cost is less than CNN-based methods. As shown in Table 3 of FIG. 6, the computational cost (GFLOPs) of the disclosed method is only 26.8% of that of SAFA [20]. It is also more efficient in terms of training GPU memory consumption while achieving a much higher performance. In addition, the disclosed method is faster than SAFA during inference, indicating its superiority for real-world applications. Since L2LTR [30] does not provide detailed computation measurement in the paper, their code is analyzed and to show a comparison in supplementary material.

Ablation Study

Polar Transform: In Table 4 of FIG. 7, the effect of polar transform on both CVUSA and VIGOR is shown. Polar transform has been shown to significantly improve CNN-based methods, but it only has a marginal improvement on the disclosed pure transformer model because the geometric information is explicitly encoded and learned in the learnable position embedding. Therefore, the presently claimed invention does not use polar transform to maintain a simpler pipeline. For VIGOR [35], the authors claim that polar transform would not work because the two views are not spatially aligned. This point is verified in Table 5 of FIG. 8, which is clear from the performance drop of SAFA when a polar transform is applied. Since the center of the aerial image may not be the location of street-view query, using the center to apply polar transform can break the geometric correspondence. Therefore, the presently claimed invention does not apply a polar transform for VIGOR.

ASAM: In Table 6 in FIG. 9, the effectiveness of ASAM on both VIGOR and CVUSA is shown. ASAM brings 8.83% and 3.16% R@1 improvement on VIGOR and CVUSA, respectively. For VIGOR dataset, "TransGeo w/o ASAM" still outperforms previous methods by a large margin, which means transformer-based method has significant superiority over CNN-based method when the two views are not perfectly aligned. On CVUSA, "TransGeo w/o ASAM" performs on par with polar-transform-based methods using less computation.

Attention-guided Non-uniform Cropping: An ablation study is conducted to demonstrate the effectiveness of the disclosed attention-guided non-uniform cropping. As shown in Table 4 in FIG. 7, "Stage-1" does not use any cropping strategy and is trained for the same number of epochs as the Stage-2 models. The inventors discovered that simply training for more epochs (200 vs 100) does not improve the performance. "Stage-2 ($\beta$=0.64, $\gamma$=1)" removes 36% of the patches (64% kept), and does not increase the resolution $\gamma$=1. The performance only has a negligible drop, 0.36 for VIGOR and 0.1 for CVUSA. The results indicate that the removed patches are actually uninformative for cross-view geo-localization, and the attention guidance makes sense. Then further reallocate the saved computation by increasing the resolution ($\gamma$=1.56), resulting 1.56 times more number of patches, which is the same as in the original "Stage-1" model. With the same number of patches, the performance is improved on both VIGOR and CVUSA.

Learnable Position Embedding: The position embedding (abbreviated as "Pos. Emb.") is crucial for pure transformer-based methods, as there is no implicit position information (locality in CNN) for each input token. In Table 7 in FIG. 11, "Learnable Pos. Emb." with the popular predefined "Fixed Position Embedding" is compared, Sinusoidal Embedding [27]. The 2D version [6] is used for the disclosed image-based task, and all ablations are based on Stage-1 model. Results show that learnable position embedding significantly outperforms the fixed position embedding, indicating that learnable position embedding highly benefits the pure transformer model when the cross-view domain gap is large.

Effect of $\beta$ and $\gamma$: In Table 8 in FIG. 12, the effect of different $\beta$ and $\gamma$ is shown, removing different numbers of patches and zoom-in with different resolutions (denoted as "Res."). For each $\beta$, two $\gamma$ values, $\gamma=1$ and $\gamma=1/\beta$ are used. The results indicate that removing up to 47% of patches still yields a very small performance drop, while the higher resolution does not bring further performance improvement. As a result, the best performed $\beta=0.64$ as is an example default setting.

Visualization

Figures 9, 10:
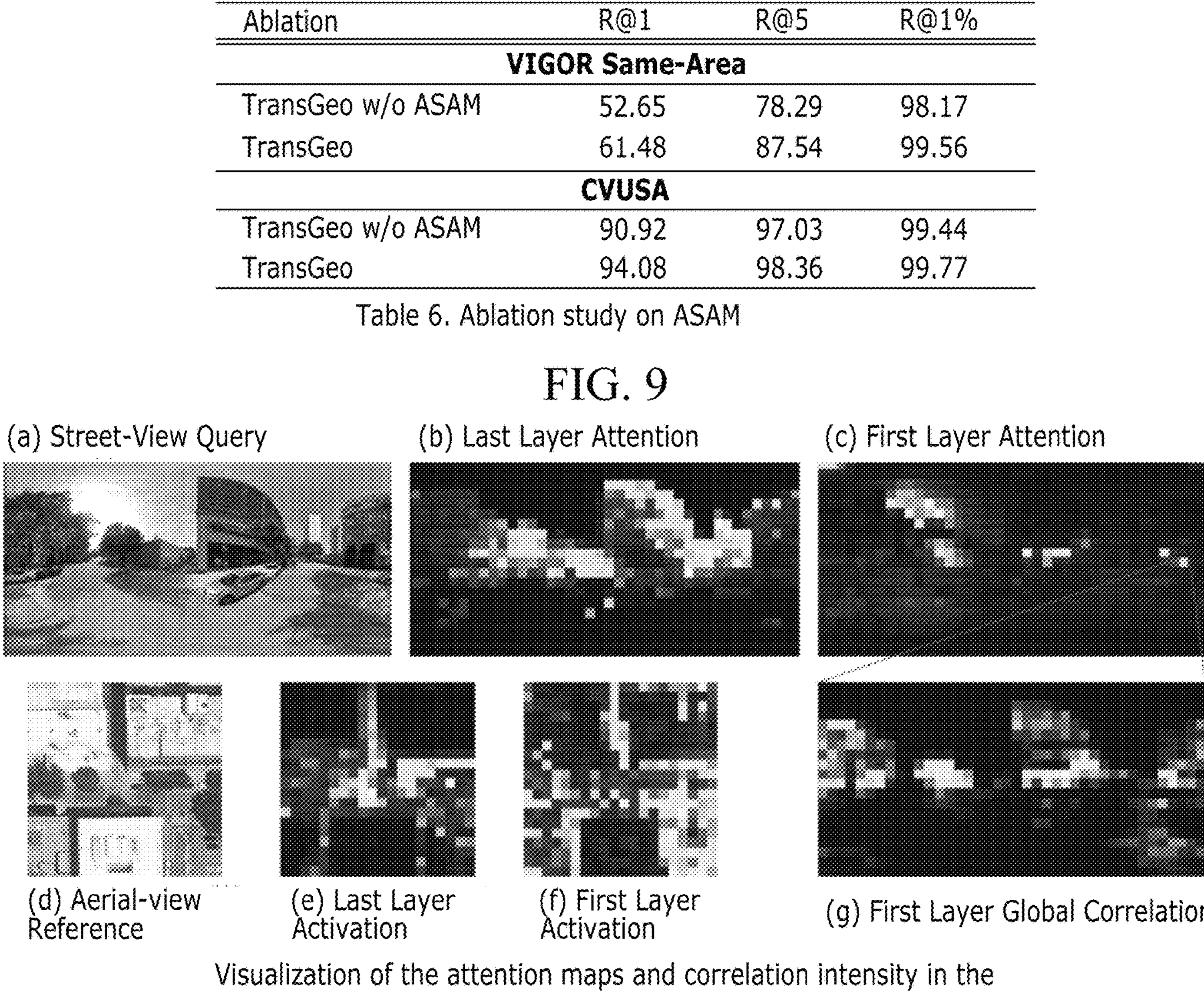
FIG. 9 is Table 6 illustrating an ablation study on ASAM, according to one aspect of the present invention.
FIG. 10 is a visualization of the attention maps and correlation intensity in the first and last layer of the claimed invention transformer encoders, according to one aspect of the present invention.

In FIG. 10, the attention maps of disclosed model is visualized on VIGOR as described in the section entitled "Attention-guided Non-uniform Cropping". Given a pair of street-view and aerial-view images in FIG. 10A, FIG. 10D, the overall attention of each location from the first and last layers in FIG. 10B, FIG. 10C, FIG. 10E, FIG. 10F is generated. The attention map of the last layer generally better aligns with the semantics of the images than the first layer and provides more high-level information that highlights informative regions. Therefore, leveraging the attention map from the last layer as guidance is reasonable. The patch is selected with maximal overall attention in FIG. 10C and visualize the correlation map between this patch and all patches in the first layer, as shown in FIG. 10G. The result demonstrates that strong global correlation (high correlation scores distributed over the entire correlation map) is learned in the disclosed pure transformer model, which is a clear advantage over CNN-based methods.

Conclusion and Discussion

Disclosed is the first pure transformer method (TransGeo) for cross-view image geo-localization. It achieves state-of-the-art results on both aligned and unaligned datasets, with less computational cost than CNN-based methods. The disclosed method does not rely on polar transform, data augmentation, thus is generic and flexible.

One limitation of TransGeo is that it uses a two-stage pipeline. Developing a one-stage generic transformer for cross-view image geo-localization would be promising for future study. Another limitation is that the patch selection simply uses the attention map, which is not learnable with parameters. Better patch selection is worth exploring to focus on more informative patches. The meter-level localization could also be improved with additional offset prediction like [35] in the future.

Supplementary Material

In this supplementary material, the inventors provide the following items for better understanding this patent:

1. Head-to-head comparison with L2LTR.
2. Performance on CVACT.
3. Limited FoV results on CVUSA.
4. Unknown orientation results on VIGOR.
5. Example of polar transform on VIGOR.
6. Example of Non-uniform Crop in CVUSA.
7. Qualitative results.
8. Implementation details.

Head-to-Head Comparison with L2LTR

In Table 9 in FIG. 13, shown is a detailed head-to-head comparison between the disclosed TransGeo and L2LTR [30], which was published after the submission deadline. TransGeo has clear superiority over L2LTR in terms of both performance and computational efficiency. The disclosed method is pure transformer-based, L2LTR adopts vanilla ViT [6] on the top of ResNet [8], resulting in a hybrid CNN+transformer approach. L2LTR [30] does not provide GFLOPs and GPU memory consumption, but the authors claim that L2LTR requires significantly more GPU memory and pretraining data than CNN-base methods, SAFA. Their code is used and verify that L2LTR has much large GPU memory consumption and GFLOPs than the disclosed method. Since L2LTR does not conduct experiments on VIGOR, the performance (R@1) on CVUSA is compared. Although the performance of L2LTR can be improved to 94.05 with polar transform, the overall performance is still lower than TransGeo. Note that the polar transform does not work well when the two views are not spatially aligned (as discussed in the ablation study of above), VIGOR [35], while TransGeo generalizes well on such scenarios with clear advantages.

Performance on CVACT

As shown in Table 10 in FIG. 14, the disclosed TransGeo achieves state-of-the-art result on CVACT. Although CVACT and CVUSA are both aligned scenarios, removing patches cause more performance drop on CVACT than CVUSA is observed. One possible explanation is that the satellite images of CVACT (zoom-level=20) have different resolutions from CVUSA (zoom-level=18), resulting in a smaller covering range for each image.

Unknown Orientation Results on VIGOR

In Table 11 in FIG. 15, illustrated is the performance of TransGeo and VIGOR [35] with unknown orientation by randomly shifting the panorama horizontally. TransGeo outperforms VIGOR with a large margin, indicating that TransGeo's superiority does not rely on the orientation alignment between two views.

Limited FoV Results on CVUSA

In Table 12 in FIG. 16, illustrated is the performance of TransGeo and DSM [21] on CVUSA with limited FoV (Field of View), by randomly cropping the panorama with random shift. The orientation is also unknown. TransGeo significantly outperforms DSM on FoV=1800 and FoV=90°, indicating that TransGeo's superiority does not rely on the wide FoV of panorama. The performance gap is more significant when the FoV is smaller.

Polar Transform Example on VIGOR

In FIG. 17, illustrated is an example of polar transform on VIGOR to demonstrate why it fails in unaligned scenarios. (a) and (b) are the original street-view and aerial-view images, and the red star in (b) indicates the location of the street-view query. (c) is generated with the vanilla polar transform using the center of aerial image. VIGOR assumes that the street-view query does not lie at the center of aerial image, and the red star is used (as shown in (b)) to denote the actual location. (d) is generated by using the red star location as the center (adjustment to the spatial alignment) for polar transform, denoted as 'Polar Transform w/Alignment'. The spatial offset of query can cause distortion in (c), and even the aligned (d) does not have a good geometric correspondence with the street-view query, due to the strong occlusion. Polar transform assumes that objects far away from the query location has a large vertical coordinates in the street-view image. However, this does not model the geometric relationship between the two views well when there are tall buildings close to the street-view query location. Besides, the roof of the building and other occluded objects occupy a large space in the transformed images (c) and (d), but they are not visible in the street-view, thus do not help the cross-view matching.

Example of Non-Uniform Crop in CVUSA

Figure 18:
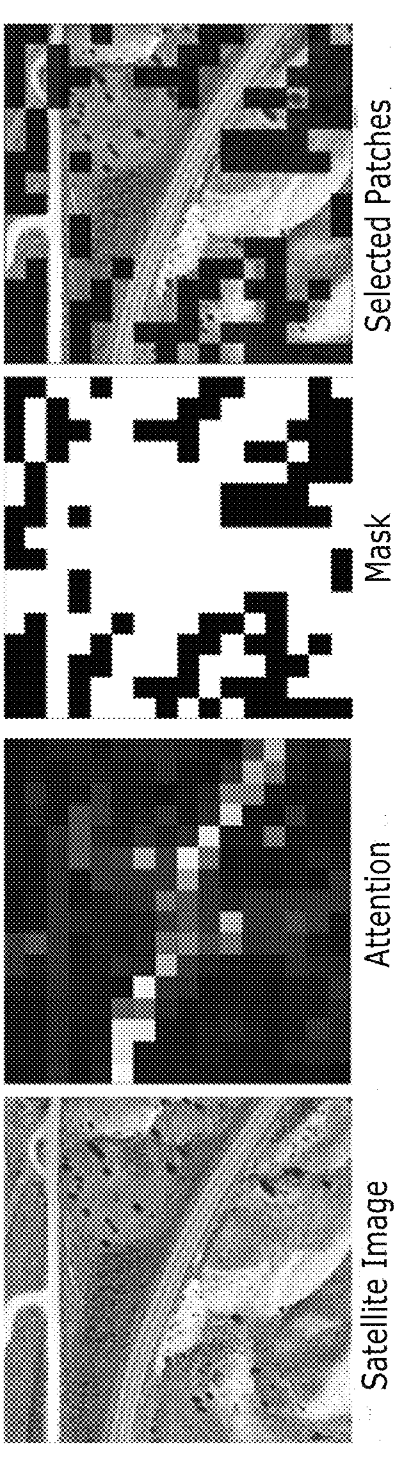
FIG. 18 is an example of an attention map and non-uniform crop on CVUSA, according to one aspect of the present invention.

As discussed above, only the example of non-uniform crop on city scenarios (VIGOR) is shown. The attention map and cropping selection for rural scenarios (CVUSA) in FIG. 18 is shown. The attention map in rural areas looks more scattering/uniform than in cities, but they still focus more on discriminative objects, and roads.

Qualitative results on CVUSA. Red box indicates ground-truth in retrieved results. The ground-truth is ranked at 1, 2, 6, 148 for four queries, respectively.

Qualitative results on VIGOR. Red box indicates ground-truth in retrieved results. The ground-truth is ranked at 1, 2, 9, 165 for four queries, respectively.

Qualitative Results

Figure 19:
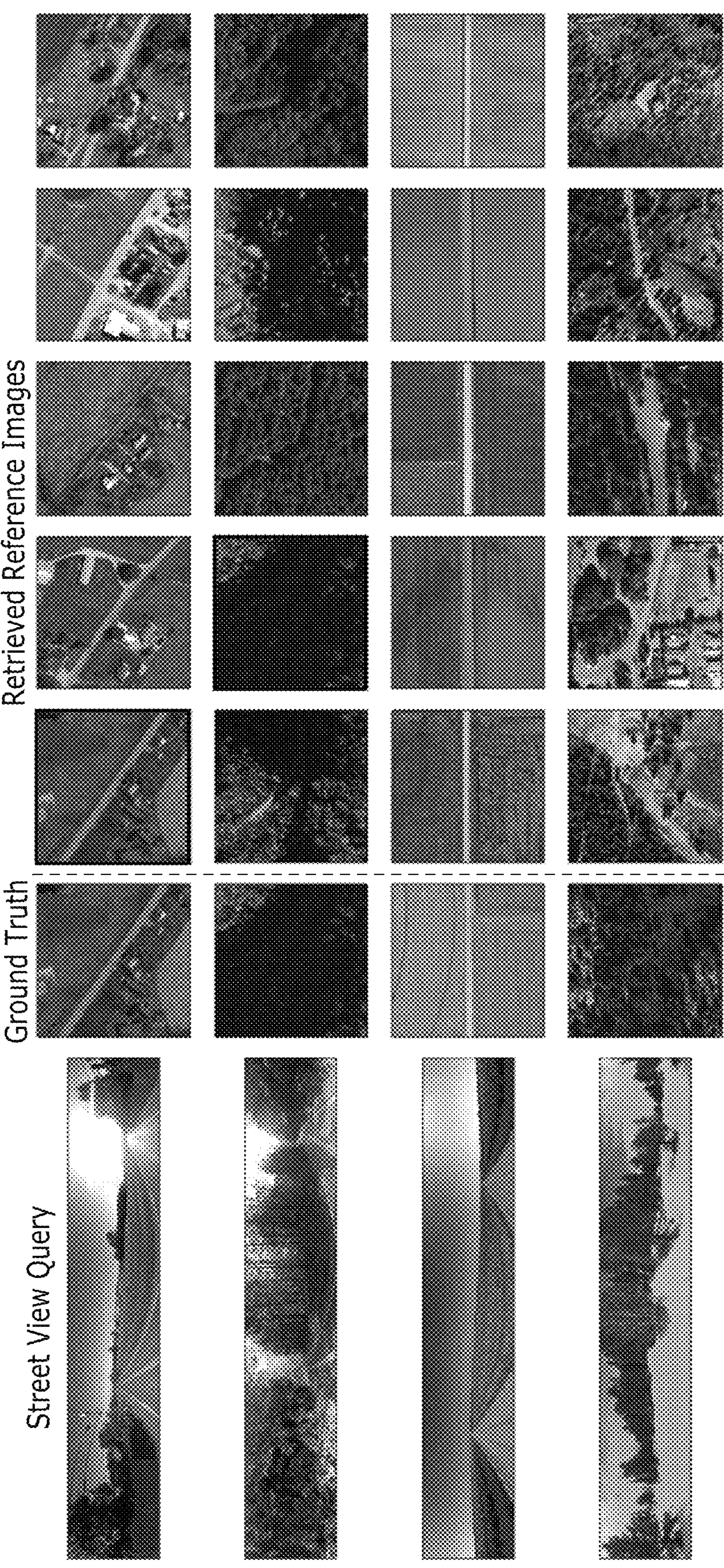
FIG. 19 is a visualization of qualitative results on CVUSA, according to one aspect of the present invention.
Figure 20:
FIG. 20 is a visualization of qualitative results on VIGOR. Red box indicates ground-truth in retrieved results, and the ground-truth is ranked at 1, 2, 9, 165 for four queries, respectively, according to one aspect of the present invention.

In FIGS. 19 and 20, qualitative results of TransGeo on the CVUSA and VIGOR datasets are included. Four queries are selected for each dataset with the ground-truth image ranked at 1, [2,5], [6,100] and >100, representing both success and failure cases for analysis. The ground-truth in retrieved results is marked with red box. For the first row of FIGS. 11 and 11, the ground-truth is retrieved as the first one, which is very similar to the second one. This indicates TransGeo's strong discriminative ability. The other failure cases in CVUSA are due to extreme lighting condition (too dark), lack of recognizable objects (only road and grass) with hard negative reference (the first retrieved one has a very similar color to the street-view query), and different capture seasons (query was taken in winter with snow) of two views. For VIGOR, the retrieval is more challenging because of semi-positive samples [35], which cover the query image at edge area. The second and third rows both retrieve semi-positive samples, as did the first one. This is not considered as correct top-1 prediction, but their GPS location is actually very close to the ground-truth, resulting in good performance in meter-level evaluation. For the last row, the model fails because only trees and roads are visible in the query. They do not provide enough information to distinguish the ground-truth from other aerial images with trees.

Implementation Details

In this example, use $\rho$=2.5 for ASAM [10]. The weight decay of AdamW is set to 0.03, with default epsilon and other parameters in PyTorch [17]. The sampling strategy is the same as [35], but is re-implemented with PyTorch. Details are included in the code.

General Computer for Implementing Algorithm

FIG. 21 illustrates a block diagram illustrating a processor 2100 according to an example. The processor 2100 is an example of a processing subsystem that is able to perform any of the above described processing operations, control operations, other operations, or combinations of these.

The processor 2100 in this example includes a CPU 2104 that is communicatively connected to a main memory 2106 (e.g., volatile memory), a non-volatile memory 2112 to support processing operations. The CPU is further communicatively coupled to a network adapter hardware 2116 to support input and output communications with external computing systems such as through the illustrated network 2130.

The processor 2100 further includes a data input/output (I/O) processor 2114 that is able to be adapted to communicate with any type of equipment, such as the illustrated system components 2128. The data input/output (I/O) processor in various examples is able to be configured to support any type of data communications connections including present day analog and/or digital techniques or via a future communications mechanism. A system bus 2118 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

Incorporated References

The following publications are each incorporated by reference in their entirety and listed in the Information Disclosure:

[1] Eli Brosh, Matan Friedmann, Ilan Kadar, Lev Yitzhak Lavy, Elad Levi, Shmuel Rippa, Yair Lempert, Bruno Fernandez-Ruiz, Roei Herzig, and Trevor Darrell. Accurate visual localization for automotive applications. In *Proceedings of the IEEE Conference on Computer Vision and Pattern Recognition Workshops*, pages 0-0, 2019.

[2] Sudong Cai, Yulan Guo, Salman Khan, Jiwei Hu, and Gongjian Wen. Ground-to-aerial image geo-localization with a hard exemplar reweighting triplet loss. In *Proceedings of the IEEE International Conference on Computer Vision*, pages 8391-8400, 2019.

[3] Xiangning Chen, Cho-Jui Hsieh, and Boqing Gong. When vision transformers outperform resnets without pretraining or strong data augmentations. *arXiv preprint arXiv:*2106.01548, 2021.

[4] Jia Deng, Wei Dong, Richard Socher, Li-Jia Li, Kai Li, and Li Fei-Fei. Imagenet: A large-scale hierarchical image database. In 2009 *IEEE conference on computer vision and pattern recognition*, pages 248-255. IEEE, 2009.

[5] Jacob Devlin, Ming-Wei Chang, Kenton Lee, and Kristina Toutanova. Bert: Pretraining of deep bidirectional transformers for language understanding. *arXiv preprint arXiv:*1810.04805, 2018.

[6] Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. In *International Conference on Learning Representations,* 2020.

[7] Ian Goodfellow, Jean Pouget-Abadie, Mehdi Mirza, Bing Xu, David Warde-Farley, Sherjil Ozair, Aaron Courville, and Yoshua Bengio. Generative adversarial nets. In *Advances in neural information processing systems*, pages 2672-2680, 2014.

[8] Kaiming He, Xiangyu Zhang, Shaoqing Ren, and Jian Sun. Deep residual learning for image recognition. In *Proceedings of the IEEE conference on computer vision and pattern recognition*, pages 770-778, 2016.

[9] Sixing Hu, Mengdan Feng, Rang M H Nguyen, and Gim Hee Lee. Cvm-net: Cross-view matching network for image-based ground-to-aerial geo-localization. In *Proceedings of the IEEE Conference on Computer Vision and Pattern Recognition*, pages 7258-7267, 2018.

[10] Jungmin Kwon, Jeongseop Kim, Hyunseo Park, and In Kwon Choi. Asam: Adaptive sharpness-aware minimization for scale-invariant learning of deep neural networks. *arXiv preprint arXiv:*2102.11600, 2021.

[11] Tsung-Yi Lin, Serge Belongie, and James Hays. Cross-view image geolocalization. In *Proceedings of the IEEE Conference on Computer Vision and Pattern Recognition*, pages 891-898, 2013.

[12] Liu and Hongdong Li. Lending orientation to neural networks for cross-view geo-localization. In *Proceedings of the IEEE conference on computer vision and pattern recognition*, pages 5624-5633, 2019.

[13] Ang Li, Huiyi Hu, Piotr Mirowski, and Mehrdad Farajtabar. Cross-view policy learning for street navigation. In *Proceedings of the IEEE International Conference on Computer Vision*, pages 8100-8109, 2019.

[14] Ilya Loshchilov and Frank Hutter. Sgdr: Stochastic gradient descent with warm restarts. *arXiv preprint arXiv:*1608.03983, 2016.

[15] Ilya Loshchilov and Frank Hutter. Decoupled weight decay regularization. *arXiv preprint arXiv:*1711.05101, 2017.

[16] Piotr Mirowski, Matt Grimes, Mateusz Malinowski, Karl Moritz Hermann, Keith Anderson, Denis Teplyashin, Karen Simonyan, Andrew Zisserman, Raia Hadsell, et al. Learning to navigate in cities without a map. In *Advances in Neural Information Processing Systems*, pages 2419-2430, 2018.

[17] Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. *Advances in neural information processing systems,* 32:8026-8037, 2019.

[18] Krishna Regmi and Mubarak Shah. Bridging the domain gap for ground-to-aerial image matching. In *Proceedings of the IEEE International Conference on Computer Vision*, pages 470-479, 2019.

[19] Florian Schroff, Dmitry Kalenichenko, and James Philbin. Facenet: A unified embedding for face recognition and clustering. In *Proceedings of the IEEE conference on computer vision and pattern recognition*, pages 815-823, 2015.

[20] Yujiao Shi, Liu, Xin Yu, and Hongdong Li. Spatial-aware feature aggregation for image based cross-view geo-localization. In *Advances in Neural Information Processing Systems*, pages 10090-10100, 2019.

[21] Yujiao Shi, Xin Yu, Dylan Campbell, and Hongdong Li. Where am i looking at? joint location and orientation estimation by cross-view matching. In *Proceedings of the IEEE/CVF Conference on Computer Vision and Pattern Recognition*, pages 4064-4072, 2020.

[22] Bin Sun, Chen, Yingying Zhu, and Jianmin Jiang. Geocapsnet: Ground to aerial view image geo-localization using capsule network. In 2019 *IEEE International Conference on Multimedia and Expo* (*ICME*), pages 742-747. IEEE, 2019.

[23] Christian Szegedy, Vincent Vanhoucke, Sergey Ioffe, Jon Shlens, and Zbigniew Wojna. Rethinking the inception architecture for computer vision. In *Proceedings of the IEEE conference on computer vision and pattern recognition*, pages 2818-2826, 2016.

[24] Yicong Tian, Chen, and Mubarak Shah. Cross-view image matching for geo-localization in urban environments. In *Proceedings of the IEEE Conference on Computer Vision and Pattern Recognition*, pages 3608-3616, 2017.

[25] Aysim Toker, Qunjie Zhou, Maxim Maximov, and Laura Leal-Taixé. Coming down to earth: Satellite-to-street view synthesis for geo-localization. In *Proceedings* of the IEEE/CVF Conference on Computer Vision and Pattern Recognition, pages 6488-6497, 2021.

[26] Hugo Touvron, Matthieu Cord, Matthijs Douze, Francisco Massa, Alexandre Sablayrolles, and Hervé Jégou. Training data-efficient image transformers & distillation through attention. In *International Conference on Machine Learning*, pages 10347-10357. PMLR, 2021.

[27] Ashish Vaswani, Noam Shazeer, Niki Parmar, Jakob Uszkoreit, Llion Jones, Aidan N Gomez, tukasz Kaiser, and Illia Polosukhin. Attention is all you need. In *Advances in neural information processing systems*, pages 5998-6008, 2017.

[28] Nam N Vo and James Hays. Localizing and orienting street views using overhead imagery. In *European conference on computer vision*, pages 494-509. Springer, 2016.

[29] Scott Workman, Richard Souvenir, and Nathan Jacobs. Wide-area image geolocalization with aerial reference imagery. In *Proceedings of the IEEE International Conference on Computer Vision*, pages 3961-3969, 2015.

[30] Hongji Yang, Xiufan Lu, and Yingying Zhu. Cross-view geo-localization with layer-to-layer transformer. *Advances in Neural Information Processing Systems,* 34, 2021.

[31] Sangdoo Yun, Dongyoon Han, Seong Joon Oh, Sanghyuk Chun, Junsuk Choe, and Youngjoon Yoo. Cutmix: Regularization strategy to train strong classifiers with localizable features. In *Proceedings of the IEEE/CVF International Conference on Computer Vision*, pages 6023-6032, 2019.

[32] Amir Roshan Zamir and Mubarak Shah. Accurate image localization based on google maps street view. In *European Conference on Computer Vision*, pages 255-268. Springer, 2010.

[33] Menghua Zhai, Zachary Bessinger, Scott Workman, and Nathan Jacobs. Predicting ground-level scene layout from aerial imagery. In *Proceedings of the IEEE Conference on Computer Vision and Pattern Recognition*, pages 867-875, 2017.

[34] Sijie Zhu, Taojiannan Yang, and Chen. Revisiting street-to-aerial view image geo-localization and orientation estimation. In *Proceedings of the IEEE/CVF Winter Conference on Applications of Computer Vision* (*WACV*), pages 756-765, January 2021.

[35] Sijie Zhu, Taojiannan Yang, and Chen. Vigor: Cross-view image geo-localization beyond one-to-one retrieval. In *Proceedings of the IEEE/CVF Conference on Computer Vision and Pattern Recognition*, pages 3640-3649, 2021.

[36] https://developers.google.com/maps/documentation/maps-static/intro.

What is claimed is:

1. A cross-view image geo-localization method comprising:

electronically performing with an information processor each of, a first stage operation for acquiring ground-view images and aerial-view images of a geographical position, the aerial-view images are at a first resolution;

establishing a first training set using each of the ground-view images and its corresponding ground-truth aerial image;

training a ground-view image transformer-encoder with the first training set to produce ground-view image transformer/encoder weights;

training a first aerial-view image transformer-encoder with the first training set to produce a first set of aerial-view image encoder weights;

a second stage operation for generating, using the first set of aerial-view image encoder weights after completion of the first stage training, a spatial attention map identifying high-saliency regions of the aerial-view images at the first resolution;

accessing aerial-view images at a second resolution, the second resolution being higher than the first resolution;

performing non-uniform spatial cropping of the aerial-view images at the second resolution based on the spatial attention map generated from the first set of aerial-view image encoder weights;

establishing a second training set comprising the non-uniformly cropped higher-resolution aerial-view images; and training a second aerial-view image transformer-encoder with the second training set, wherein the first aerial-view image transformer-encoder and the second aerial-view image transformer-encoder are distinct training instances.

2. The method of claim 1, wherein the training the ground-view image transformer-encoder further includes training with a first set of class tokens to integrate classification information.

3. The method of claim 2, wherein the training the first aerial-view image transformer-encoder further includes training with a second set of class tokens to integrate classification information.

4. The method of claim 3, wherein the generating, using the first set of aerial-view image encoder weights after completion of the first stage training, the spatial attention map identifying high-saliency regions of the aerial-view images at the first resolution includes the second set of class tokens.

5. The method of claim 3, wherein the training the second aerial-view image transformer-encoder further includes training with a third set of class tokens to integrate classification information.

6. The method of claim 1, wherein the first stage operation is independent of polar transforms.

7. The method of claim 2, wherein the second stage operation is independent of polar transforms.

8. The method of claim 1, wherein the first stage operation is without data augmentation.

9. The method of claim 8, wherein the second stage operation is without data augmentation.

10. The method of claim 1, wherein the aerial images at the first resolution are a down-sampled version of the aerial images at the second resolution.

11. The method of claim 1, wherein the aerial images at the second resolution are an up-sampled version of the aerial images at the first resolution.

12. A system for cross-view image geo-localization, the system comprising memory;

at least one processor operatively coupled to the memory for performing each of a first stage operation for acquiring ground-view images and aerial-view images of a geographical position, the aerial-view images are at a first resolution;

establishing a first training set using each of the ground-view images and its corresponding ground-truth aerial image;

training a ground-view image transformer-encoder with the first training set to produce ground-view image transformer/encoder weights;

training a first aerial-view image transformer-encoder with the first training set to produce a first set of aerial-view image encoder weights;

a second stage operation for generating, using the first set of aerial-view image encoder weights after completion of the first stage training, a spatial attention map identifying high-saliency regions of the aerial-view images at the first resolution;

accessing aerial-view images at a second resolution, the second resolution being higher than the first resolution;

performing non-uniform spatial cropping of the aerial-view images at the second resolution based on the spatial attention map generated from the first set of aerial-view image encoder weights;

establishing a second training set comprising the non-uniformly cropped higher-resolution aerial-view images; and training a second aerial-view image transformer-encoder with the second training set, wherein the first aerial-view image transformer-encoder and the second aerial-view image transformer-encoder are distinct training instances.

13. The system of claim 12, wherein the training the ground-view image transformer-encoder further includes training with a first set of class tokens to integrate classification information.

14. The system of claim 13, wherein the training the first aerial-view image transformer-encoder further includes training with a second set of class tokens to integrate classification information.

15. The system of claim 14, wherein the generating, using the first set of aerial-view image encoder weights after completion of the first stage training, the spatial attention map identifying high-saliency regions of the aerial-view images at the first resolution includes the second set of class tokens.

16. The system of claim 14, wherein the training the second aerial-view image transformer-encoder further includes training with a third set of class tokens to integrate classification information.

17. The system of claim 12, wherein the first stage operation is independent of polar transforms and the second stage operation is independent of polar transforms.

18. The system of claim 12, wherein the first stage operation is without data augmentation and the second stage operation is without data augmentation.

19. The system of claim 12, wherein the aerial images at the first resolution are a down-sampled version of the aerial images at the second resolution.

20. He system of claim 12, wherein the aerial images at the second resolution are an up-sampled version of the aerial images at the first resolution.

* * * * *